No. 643,240. Patented Feb. 13, 1900.
B. F. SHUART.
COMBINED EARTH DIGGER AND SCRAPER.
(Application filed Nov. 2, 1898.)
(No Model.) 2 Sheets—Sheet 1.
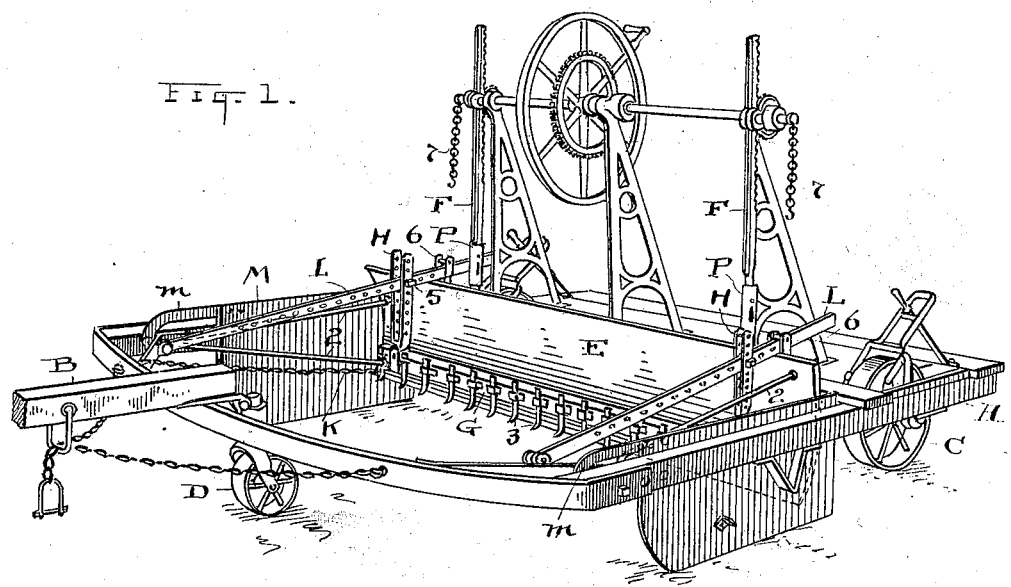
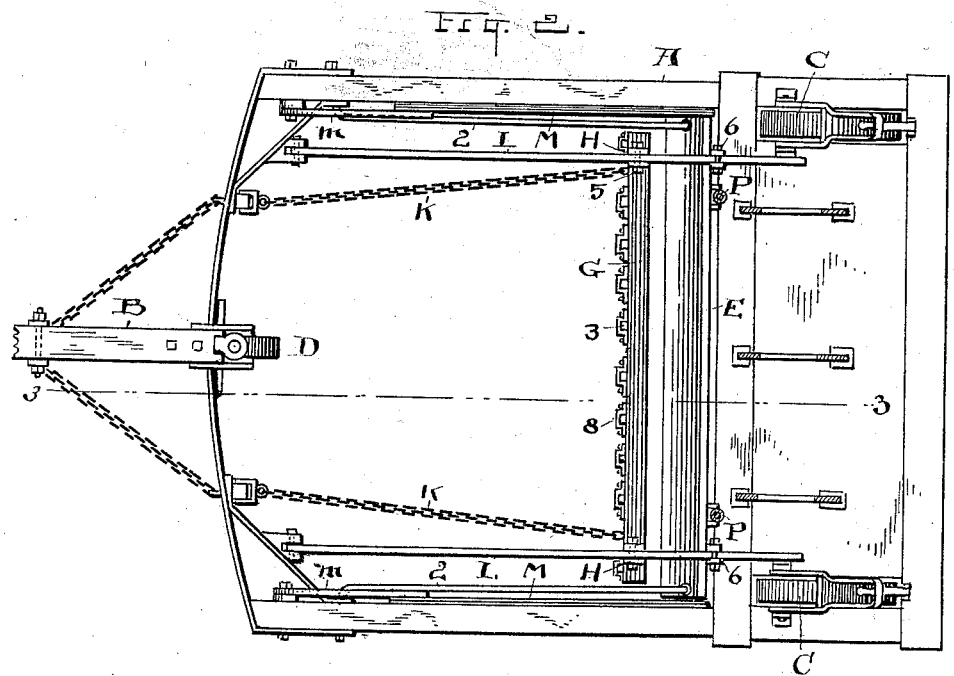
ATTEST
R B Moser
H. E. Mudra
INVENTOR
Benjamin F. Shuart
By H. F. Fisher
ATTY No. 643,240. Patented Feb. 13, 1900.
B. F. SHUART.
COMBINED EARTH DIGGER AND SCRAPER.
(Application filed Nov. 2, 1898.)
(No Model.) 2 Sheets—Sheet 2.
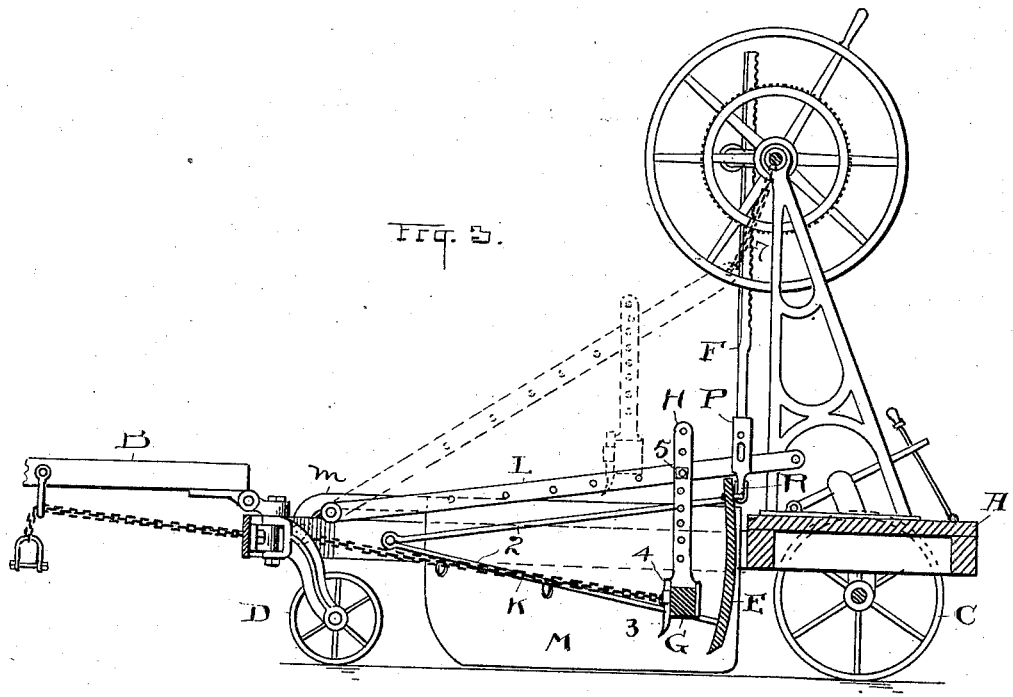
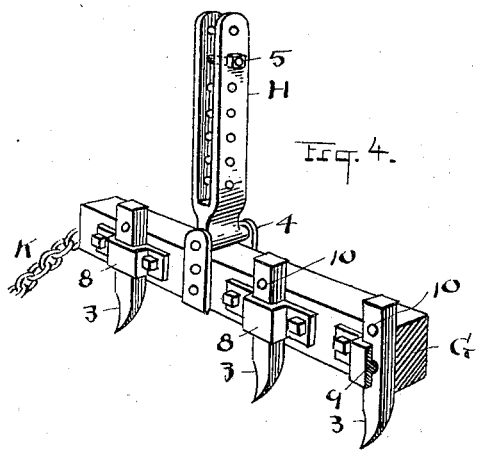
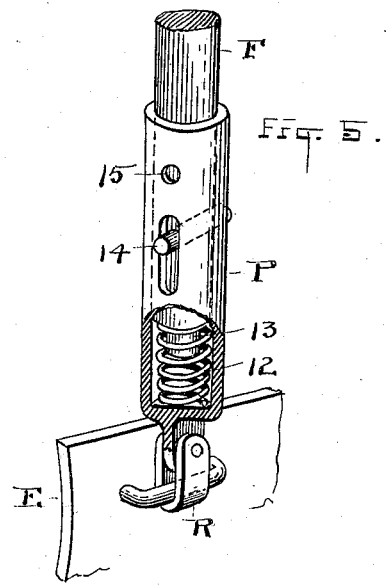

UNITED STATES PATENT OFFICE.

BENJAMIN F. SHUART, OF OBERLIN, OHIO.

COMBINED EARTH DIGGER AND SCRAPER.

SPECIFICATION forming part of Letters Patent No. 643,240, dated February 13, 1900.

Application filed November 2, 1898. Serial No. 695,311. (No model.)

*To all whom it may concern:*

Be it known that I, BENJAMIN F. SHUART, a citizen of the United States, residing at Oberlin, in the county of Lorain and State of Ohio, have invented certain new and useful Improvements in a Combined Earth Digger and Scraper; and I do declare that the following is a full, clear, and exact description of the invention, which will enable others skilled in the art to which it appertains to make and use the same.

My invention relates to a combined earth digger and scraper, and is an improvement more particularly on the invention set forth in my application for improvements in earth-scrapers filed September 8, 1896, Serial No. 605,072, and is directly in the line of my patent issued May 22, 1894, No. 520,085.

In the use of scrapers as manufactured by me it frequently becomes necessary to employ the scraper on ground that really is unprepared to receive it and whereon the scraper alone is insufficient to do the required work—as, for example, when the ground itself is of a nature to prevent the scraper from taking hold satisfactorily without previous loosening or where it has been packed and trodden down by travel. Sundry causes may enter in to produce these conditions, and from whatever cause or wherever found it is my experience that a scraper of this kind is practically incomplete unless fitted up with means within itself to go here or there and meet and overcome at least all ordinary and probable difficulties in the character and conditions of the earth to be handled. To these ends I have equipped the scraper, as shown herein, with means to prepare the earth for the scraper when such preparation is necessary, and in this instance the means consist of a series of digging-teeth arranged at suitable intervals on a common support and adapted to run in advance of the scraper and enter the earth at greater or less depth and under more or less pressure, as circumstances may require. This digging or loosening mechanism is, however, designed to be so arranged and connected up in the machine that it will be lowered to working position only when required and be out of such position and out of the way when not in use. So, also, may the digger be used alone and the scraper for the time be raised out of action—as, for example, when it is desirable to dig up and loosen a section of ground before the scraper is put to work. Both of these leading and essential parts of the invention may, therefore, be used independently of each other, but are intended to be used conjointly and in coöperation to produce a unitary result.

Referring to the accompanying drawings, Figure 1 is a perspective elevation of my new and improved combined machine, and Fig. 2 is a plan view thereof with the lifting mechanism removed, as hereinafter fully described. Fig. 3 is a longitudinal sectional elevation of the machine, substantially on line 3 3, Fig. 2. Fig 4 is a perspective view of a detail of the digger, showing one end enlarged and especially the preferred way of securing the digger-teeth as well as the means for suspending and connecting up the digger-bar. Fig. 5 is a perspective detail of the scraper and rack-bar connection.

A represents the main frame of the machine, and B the tongue or pole. C are the rear wheels, and D the front wheel, as usual, and with the usual or any sufficient means to adjust the elevation of the wheels C or, more accurately speaking, the elevation of frame A in respect to the earth.

E is the scraper or scraper-blade, and F are the rack-bars or toothed standards, through which said blade is raised and lowered with respect to frame A and its work, likewise as is now old and well known in these machines.

The scraper E extends transversely of the machine from side to side within frame A and is designed to have adaptability to working depth from end to end or at each end, according as greater or less depth of operation is required at one end or the other, or at both, and the said blade is so connected up through its standards F that not only practically all the weight of the machine itself can be thrown thereon, but, when required, a quantity of weight may be added to the machine, according to the nature of the work to be done and the conditions encountered. The scraper is hung from the front of the machine on draw-rods 2, engaging the scraper at different elevations and pivoted on the main frame at their front, and the standards F are pivotally affixed to the rear of the scraper with connections constructed as hereinafter described.

G is the digger-bar, carrying a series of teeth 3, and itself is carried, when in working position, by the split or bifurcated standards H, pivotally engaged at its ends in the straps 4 on said bar and having its pivot therein above the bar, so as to enable the standard to be laid down upon the bar when it is not in use. Draft-chains K connect said bar G with the front of frame A, and said chains may be taken up more or less according as it may be desired to place the digger nearer to or farther from the scraper-blade, as hereinafter described. Obviously suitable rod connections in lieu of chains K may be used, and so also may any suitable standards in lieu of those shown.

The standards H have transverse perforations or holes through which I insert bolts or pins 5, which connect the tooth-bar adjustably and pivotally with the controlling-levers L. These levers carry the tooth-digger bar G through the standards H and are perforated at intervals in their length to move said bar forward, as may be desired, to make room for the earth in front of blade E. The digger-bar can also be raised and lowered on said levers and held entirely out of work—say as seen in dotted lines, Fig. 3—or be forced down deep into the work through them. To these ends the said levers L are directly or indirectly pivoted on the main frame at their front and connected with the scraper-blade at their rear through the ears 6 and bolts therein bearing on said levers or in any other sufficient way, the form of connection not being material except that it should not be rigid.

To engage the digger-bar in any position in advance of what it is shown to occupy, the chains K can be shortened, or any available way of shortening the draft connection may be adopted, as chains or other connections are used. In raising the digger out of use the levers L are hooked up on chains 7, and then the parts H may also be raised to lift the drag-bar to its highest position and pins 5 placed above lever L, thus allowing it to slide to the front of the machine and be wholly out of the way.

With the foregoing construction and connections of the digger I can also swing the teeth thereof into different positions in respect to a vertical plane and incline them forward or rearward from the point, as may be desired, and the pivot connections with standards H and the draft attachments K should accommodate all these changes in position. When inclined rearward, the digger can be utilized as a clod-crusher or harrow. In making these adjustments the pins 5 can be set forward or rearward in levers L or the chains K lengthened or shortened.

The digger-teeth 3 are fastened by clamps 8, bolted onto the bar G at their ends, and the said clamps have lugs or spurs 9 on their inside, adapted to engage in cavities 10 in the teeth, so as to prevent longitudinal movement of the teeth in their clamps. With this construction the teeth can get loose and yet not drop out nor work up. The lugs and cavities could be interchanged without changing the invention.

Another point of novelty is in the fenders M. In my patent above referred to I show fenders pivoted directly at their front and top; but in order that these fenders may ride or travel forward freely I have found it necessary to round their front edges somewhat sled-runner fashion. This, however, has the objection of reducing materially their confining capacity as well as being objectionable in other ways and for other reasons. Hence to avoid such objections, and especially to secure greater clearance at the front engaging point of the fender when the rear is raised, I have constructed the fender with an arm $m$, which projects from its top and front a sufficient distance to bring the pivot of the arm so far from the fender that when the rear of the fender rises the front will also rise and afford clearance at the point, as above described.

The digger shown and described is essentially what its name implies and is designed to do the same work practically as men would do with hand-picks if they had the same work to perform. The teeth 3 are therefore purposely constructed with sharp forwardly-turned points, so as to most easily penetrate the earth and tear it up, and this the digger does in a manner with eminent satisfaction, even in earth which would seem to be hardened beyond the reach of such instrumentalities.

It will be understood also from the foregoing description that when the scraper is raised out of action and the digger is in action the weight of the machine may be thrown wholly onto the digger through its lever connection with the scraper.

Finally, the scraper can be advantageously used for street-cleaning purposes; but to do this it is desirable that it have a cushioned connection with the rack-bars F, through which it always is depressed and kept down to work. This enables the scraper-blade to ride over inequalities in the pavement and to adapt itself to the work without further attention after it has been set in the right position. To these ends the rack-bar F is socketed in a close-fitting sleeve or tube P, which itself is pivotally connected with the scraper-blade by means of a yoke R or equivalent means, and in the bottom of which sleeve is a spiral spring 12. The rack-bar has a reduced extremity 13, centered in the spring 12, and a pin or bolt 14 is engaged through the said sleeve and rack-bar to hold them in operative relation. An oblong slot in the sleeve P, through which pin 14 projects at both ends when the spring is used, affords a limited sliding relation and all the room to rise that the scraper may require in streetwork, and when a rigid connection is desired for ordinary work pin 14 is inserted through the hole 15 above. Of course the essential point in this described construction is the yielding spring-pressed connection of the rack-bars with the scraper-blade, an unyielding though pivoted connection being present in my old machine, and the main object is to fit the machine for street-cleaning, as already described.

What I claim as new, and desire to secure by Letters Patent, is—

1. The main frame and the digger therein, pivotally-connected standards at the ends of the digger, levers on which the standards are adjustable, and draft-chains connecting the ends of the digger with the main frame, substantially as described.

2. The machine having a transverse scraper and fenders at the front and ends of the scraper having forwardly-extending arms on their front and top pivoted at their extremity on the frame of the machine and supporting the fenders, substantially as described.

3. The scraper and the vertically-adjustable supporting-bars pivoted thereto, and a spring-pressed connection between said bars and scraper, substantially as described.

4. The scraper and the supporting-bars at its ends, and a sliding joint between said parts and a spring in said joint to bear upon and depress the scraper, substantially as described.

5. The machine having a scraper, the rack-bars to support the scraper, a connecting member between scraper and bars having a sleeved engagement with the rack-bar and pivotally connected with the scraper, and a spring between the rack-bar and the said connecting member to cushion the scraper, substantially as described.

6. The digger-bar having a series of teeth and the supports for the digger-bar constructed and arranged to tilt the bar and incline the teeth, said supports comprising a standard pivoted at each end on the digger and levers on which the standards are adjustable in two directions, substantially as described.

7. The machine having a scraper-blade and a digger in front thereof, levers on which the digger is vertically adjustable and links connecting the scraper with said levers, substantially as described.

Witness my hand to the foregoing specification this 13th day of October, 1898.

BENJAMIN F. SHUART.

Witnesses:
H. T. FISHER,
H. E. MUDRA.